Patented Oct. 24, 1939

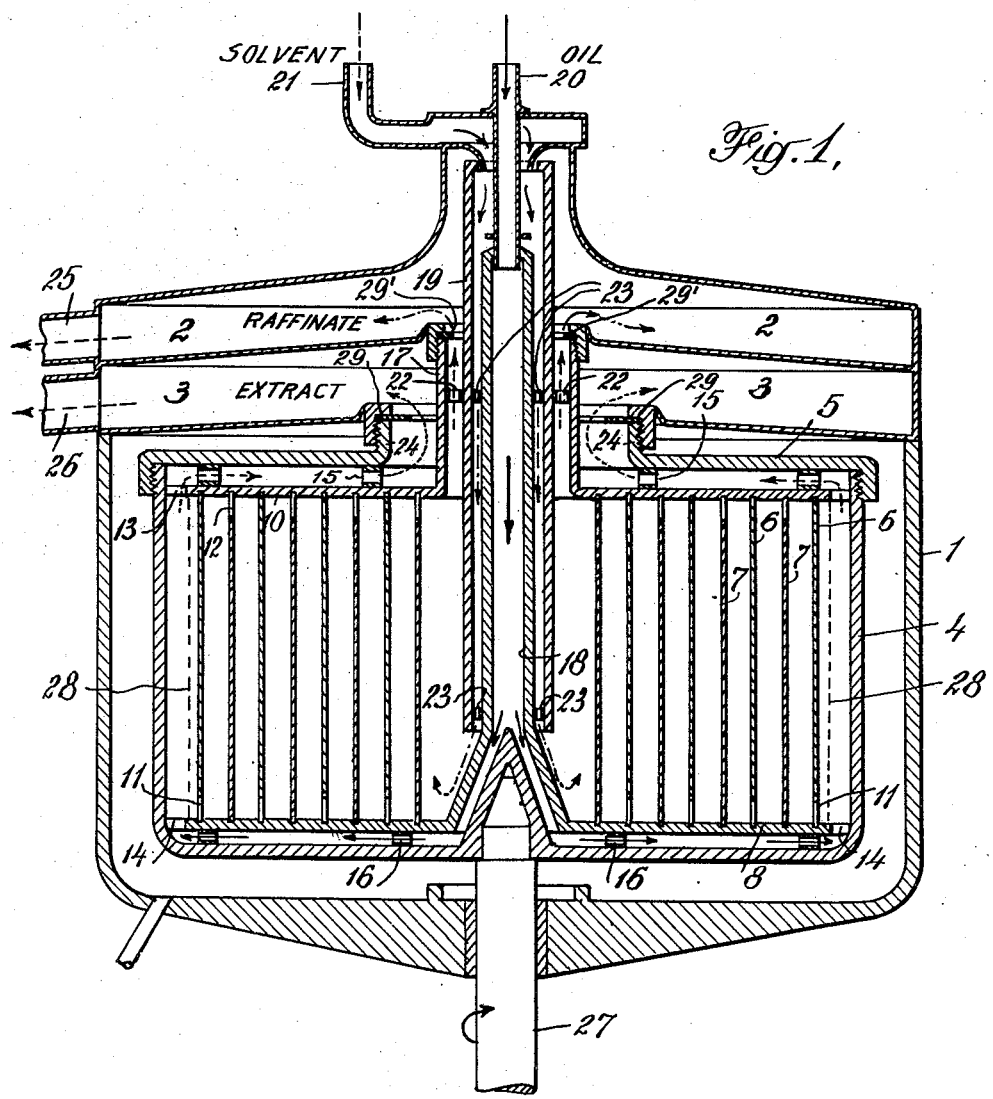

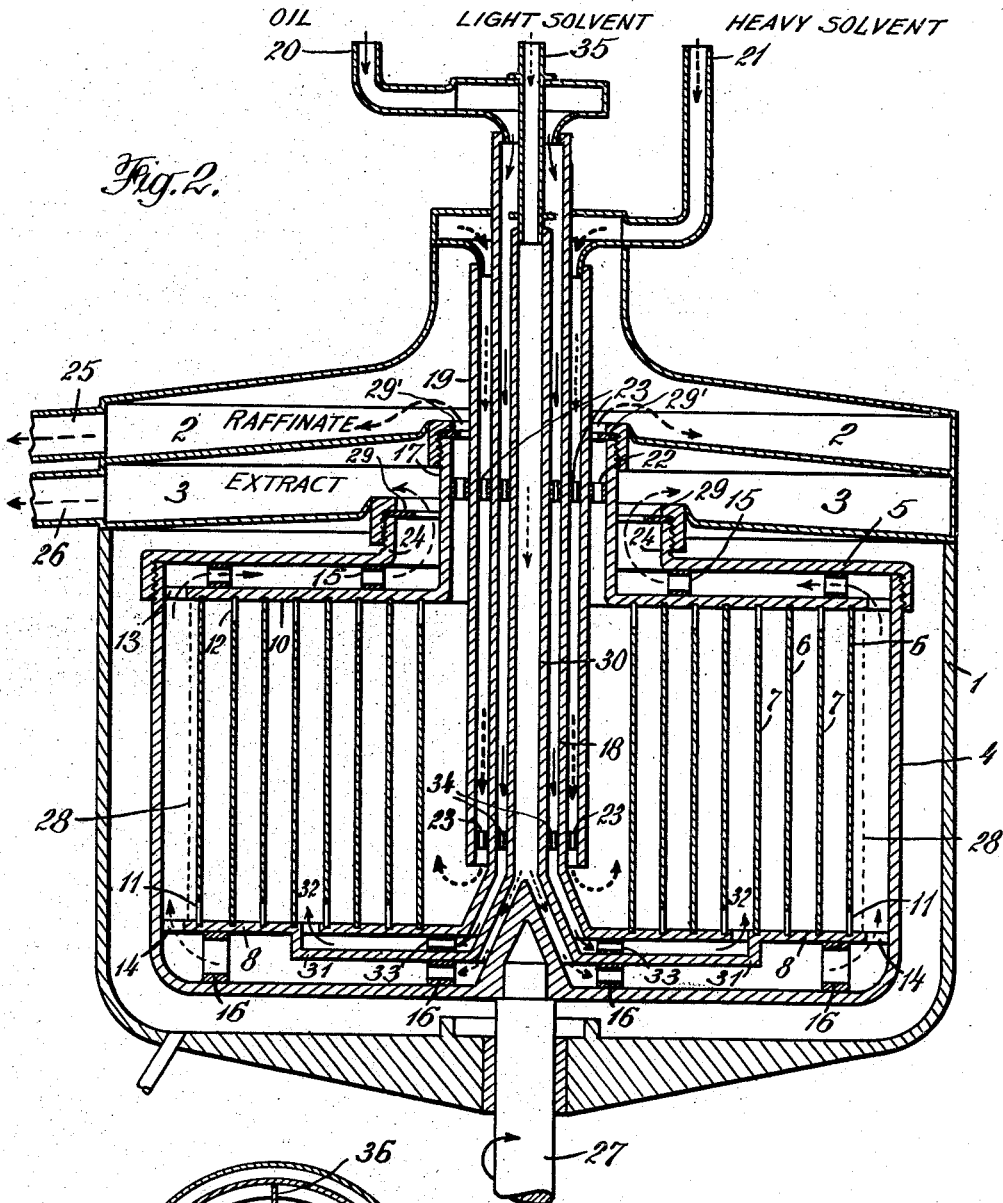
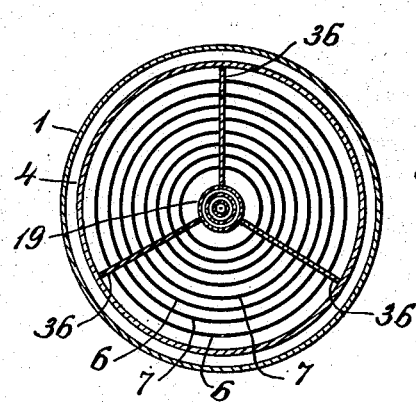

2,176,982

UNITED STATES PATENT OFFICE 2,176,982

CENTRIFUGAL COUNTERCURRENT CONTACTING MACHINE

George Thayer, East Chicago, Ind., assignor to Sinclair Refining Company, New York, N. Y., a corporation of Maine Application August 6, 1937, Serial No. 157,747

5 Claims. (Cl. 261—83)

This invention relates to apparatus for contacting partially immiscible fluids of substantially different densities and more particularly to apparatus for use in the solvent extraction of lubricating oils. The apparatus of this invention provides improved and efficient means for countercurrently contacting partially immiscible fluids and more particularly for contacting hydrocarbon lubricating oils with selective solvents.

In the solvent extraction of hydrocarbon lubricating oils, for example, extraction has been effected by thoroughly agitating the oil and solvent under suitable conditions of temperature and pressure in a mixing chamber and subsequently separating the extract and raffinate phases in a separate operation. Such a process as this has necessitated a large amount of apparatus for mixing the oil and solvent and for separating the extract and raffinate phases.

It has also been proposed to effect solvent extraction of lubricating oils by introducing the solvent and untreated oil into the top and bottom, respectively, of a baffled tower. As a further modification, solvent extraction of the oil has been effected by introducing the oil into the central portion of a vertical tower and introducing a heavy solvent into the top and a light solvent into the bottom of the tower. In such operations the mixture of oil and solvent or solvents completely fills the entire space within the tower, and contact between oil and solvent is effected by countercurrent flow of the oil and solvent or solvents due to their relative difference in gravity. Where gravity towers such as these have been used it has usually been necessary for satisfactory results that a plurality of towers be arranged in series in order that the final raffinate be sufficiently refined. Whenever it has been necessary to repair or to clean any one of the gravity towers the operation of the entire series has been discontinued, thus resulting in an obviously uneconomical use of a large amount of equipment.

The apparatus of my invention provides simple and extremely compact apparatus whereby satisfactory separation may be effected in a single stage of operation. By the use of the apparatus of my invention, a solvent extraction plant constructed with a number of these compact machines operating in parallel would not have its capacity seriously handicapped if one or even more of the machines were shut down for cleaning.

This apparatus which is adapted for contacting partially immiscible fluids of different densities comprises a rotatable bowl, means for introducing a relatively heavy fluid into the central portion of the bowl, means for introducing a relatively light fluid into the outer portion of the bowl, means for withdrawing the heavy fluid from the outer portion of the bowl, and means for withdrawing the lighter fluid from the central portion of the bowl. The rotatable bowl is provided with a plurality of cylinders substantially coaxially aligned within the bowl, the alternate cylinders being provided with openings disposed adjacent the upper portions thereof, and the intervening cylinders being provided with openings disposed adjacent the lower portions thereof.

More particularly, the apparatus of my invention comprises a centrifugal machine which may be used with advantage for subjecting a hydrocarbon oil and a suitable solvent or solvents to the action of centrifugal force to produce an extract and a raffinate phase, and for withdrawing the extract and raffinate phases. The oil and the solvent or solvents may be separately introduced into the apparatus. The extract and raffinate phases produced within the apparatus by the contact between the oil and solvent upon subjection to centrifugal force may be separately withdrawn from the apparatus.

The details of the apparatus of my invention will be clearly understood by consideration of the apparatus shown in the accompanying drawings.

Figure 1 comprises a sectional view of a centrifuge in which an unrefined oil may be subjected to selective extraction;

Figure 2 comprises a sectional view of a modified form of centrifuge; and

Figure 3 comprises a horizontal sectional view of the stationary and revolving bowls of the centrifuges.

The centrifuge shown in Figure 1 comprises a stationary bowl 1 provided with a cover divided radially into two non-communicating chambers 2 and 3. A rotatable or revolving bowl 4 provided with a cover member 5 is positioned coaxially within the stationary bowl and is rotatably mounted therein. Two sets of concentric cylinders 6 and 7 are placed within the revolving bowl 4 and substantially coaxially aligned therewith. These sets of concentric cylinders are positioned so as to alternately overlap each other, thus forming a series of annuluses. One end of one set of cylinders is rigidly mounted in the false bottom 8 of the revolving bowl and one end of the other set of cylinders is rigidly mounted in the false cover 10 of cover member 5. Suitable means may be provided on the inner surface of false cover 10 and false bottom 8 of the revolving bowl for removably holding the unmounted ends of each set of concentric cylinders securely in position. The unmounted ends of the cylinders are provided with suitable perforations 11 and 12 to allow passage of a fluid therethrough. Perforations 13 and 14 are provided in the false cover and false bottom, respectively, of the revolving bowl to permit passage of a fluid from the interior of the revolving bowl into the space between the false cover and false bottom, respectively, and the outer shell of the revolving bowl, which space is maintained by perforated spacer rings 15 and 16, respectively. The centers of the false cover and false bottom terminate in concentric cylinders 17 and 18, respectively, which extend into the cover portion of the stationary bowl. An additional cylinder 19 extends coaxially from within the cover portion of the stationary bowl between cylinders 17 and 18 to a position well within the interior of the revolving bowl. Cylinder 17 communicates with the upper section 2 of the cover portion of the stationary bowl while cylinders 18 and 19, respectively, communicate with suitable supply pipes 20 and 21. The desired space between concentric cylinders 17 and 19 and between concentric cylinders 18 and 19 is provided by perforated spacer rings 22 and 23, respectively. The collar 24 of cover member 5 extends within section 3 of the stationary bowl cover portion and provides a communicating space, together with cylinder 17, for fluid to pass from the space maintained by spacer rings 15 into section 3. Discharge spouts 25 and 26 are provided for the removal of fluid from each of sections 2 and 3 of the cover portion of the stationary bowl. Supply pipes 20 and 21 may be provided with valves (not shown) for controlling the rate of flow of fluid through these pipes. Suitable means may be provided with advantage for draining from the space between stationary bowl 1 and rotatable bowl 4 any fluid which may have leaked thereinto.

In using the apparatus of my invention shown in Figure 1 for the selective extraction of hydrocarbon lubricating oil, the oil to be treated is introduced into the centrifuge through supply pipe 20 into cylinder 18, thence through spacer rings 16 and perforations 14 into the outer portion of the interior of the revolving bowl. The solvent or suitable solvent mixture with which the oil is to be treated, and usually heavier than the oil, is introduced into the centrifuge through supply pipe 21, thence into the space between cylinders 18 and 19 through spacer rings 23 and into the central portion of the interior of the revolving bowl. The revolving bowl is rotated by means of shaft 27 thus exerting centrifugal force on the oil and solvent. The solvent, being heavier than the oil, displaces the oil at the outer portion of the revolving bowl and forces the oil toward the center of the bowl. As the oil is forced toward the center of the bowl, it passes through a tortuous path as it flows through the annuluses and perforations 11 and 12 alternately positioned at the top and bottom, respectively, of adjacent concentric cylinders 6 and 7. Thus, the oil being forced toward the center of the bowl and the solvent being forced toward the outer edge of the bowl come into contact as they pass through the annuluses. The solvent, as it approaches the outer edge of the revolving bowl, comprises a solution of the extract in the solvent (extract phase), while the oil forced toward the center of the bowl comprises the refined oil (raffinate phase). The position of the interface, which is indicated by the dotted line 28, between the oil and the extract phase in the outer portion of the revolving bowl is controlled with advantage by the internal diameter of replaceable ring dams 29 and 29'. The position of the interface is moved toward the center of the bowl by decreasing the internal diameter of ring dam 29, or, conversely, is moved toward the outer portion of the bowl by increasing the internal diameter of ring dam 29. Variation in the internal diameter of ring dam 29' has a diametrically opposite effect upon the position of the interface to that of ring dam 29. The position of the interface may, therefore, be controlled by changing the internal diameter of ring dam 29 or 29', or by the combined effect of both. The oil being forced toward the center by the extract phase tends to fill the greater portion of the bowl. The heavier solvent, or extract phase as it soon becomes, flowing counter-currently outward with respect to the oil flows upward or downward, as the case may be, on the outer edge of each annular space seeking its way to the outer portion of the bowl. At the lip of each cylinder, formed by the perforations 11 and 12, the outflowing solvent (or extract) phase and the in-flowing oil (or raffinate) phase undergo instantaneous mixing and are separated again by centrifugal force in the next succeeding annular space. As a result of this countercurrent flow and instantaneous mixing, each annular space together with the lip of the cylinders within the revolving bowl comprises a stage in a countercurrent contacting system. The extract phase collected at the outer portion of the revolving bowl passes through perforations 13 through spacer rings 15 into section 3 of the cover portion of the stationary bowl. The raffinate phase forced toward the center of the bowl flows upwardly through spacer rings 22 into section 2 of the cover portion of the stationary bowl. Thus, the operation of the apparatus comprises separately introducing the oil and solvent into the apparatus and separately discharging the extract and raffinate phases from the apparatus.

The modified form of apparatus shown in Figure 2 is adapted for use where it is desired that the oil to be treated is subjected to the action of two individual selective solvents or solvent mixtures. The apparatus itself is substantially the same as that shown in Figure 1. The modified apparatus, however, is provided with an additional cylinder 30 extending coaxially within cylinder 18 and conforming generally to the shape of cylinder 18 and false bottom 8 of the revolving bowl. The lower extension 31 of the cylinder 30 engages at its outermost end the false bottom 8 at a point substantially half way between the center and outer portion of the revolving bowl. The false bottom is further provided with perforations 32 to permit the passage of a fluid into the interior of the revolving bowl from the space between the lower extension 31 and false bottom 8. This space between lower extension 31 and false bottom 8 is maintained by perforated spacer rings 33, while the space between concentric cylinders 18 and 30 is maintained by suitable spacer rings 34. The upper portion of cylinder 30 communicates with a suitable supply pipe 35 which may be provided with a suitable valve (not shown).

In using the modified form of apparatus shown in Figure 2, the oil to be treated is introduced into the centrifuge through supply pipe 20 into the space between cylinders 18 and 30, thence through spacer rings 34 and 33 and perforations 32 into the bowl substantially half way between the center and outer portion thereof. A heavy solvent such, for example, as phenol may be introduced through supply pipe 21 and spacer rings 23 into the central portion of the revolving bowl. A suitable light solvent such, for example, as a light naphtha is introduced through supply pipe 35 into cylinder 30, thence through spacer rings 16 and perforations 14 into the outermost portion of the revolving bowl. Upon rotation of the revolving bowl by means of shaft 27, a centrifugal force of considerable magnitude may be exerted upon the oil and solvents within the bowl. The heavy solvent is forced toward the outer portion of the revolving bowl together with the heavy extract obtained from the oil by contact between the oil and the solvents. The lighter solvent is displaced from the outer portion of the revolving bowl and is forced toward the center of the bowl together with the refined oil as a raffinate produced by contact of the oil and solvents. The extract flows through perforations 13 and spacer rings 15 into section 3 of the cover portion of the stationary bowl, while the raffinate is forced upwardly through spacer rings 22 into section 2 of the cover portion. If desired, the entire apparatus may be maintained under a superatmospheric pressure by enclosing the apparatus in a suitable pressure chamber. Thus, the modified operation carried out in the apparatus shown in Figure 2 comprises a process in which the oil to be treated and two individual solvents are introduced separately into a centrifuge and separate extract and raffinate phases are discharged from the apparatus.

If it is found desirable to maintain a substantially uniform rotational speed of fluid within the apparatus shown in Figures 1 and 2, the rotatable bowl may be provided with a plurality of vertical radial partitions 36 as shown in Figure 3. These vertical radial partitions may extend substantially the entire distance between false bottom 8 and false cover 10 of the revolving bowl and also extend substantially the entire distance between cylinder 19 and the outer shell 4 of the revolving bowl.

Many advantages are realized from the use of the apparatus of my invention. An efficient and complete separation of the extract and raffinate phases is produced by the centrifugal force set up within the centrifuge. Inasmuch as the greater bulk of the fluid substantially completely filling the entire revolving bowl comprises the oil (or raffinate), a thin film of the heavy solvent (or extract) is maintained at the outer edge of each annular space. The thin film thickness of the extract at the outer portion of each annular space together with the forceful mixing at the lip of each of the concentric cylinders within the bowl produces a highly efficient mixing of oil and solvent.

The compactness and simplicity of the centrifuge conserves space and simplifies the operation as well as cleaning of the apparatus. Moreover, inasmuch as the apparatus of my invention thoroughly mixes the oil and solvent and efficiently separates the extract and raffinate phases, the treatment with a single machine may constitute with advantage the complete treatment of the oil. A solvent plant using the apparatus of this invention carried out in a number of machines operating in parallel, therefore, would not be seriously handicapped with respect to its overall capacity if one or even several machines were shut down for cleaning or repair.

While the apparatus of my invention has been described with respect to its use in the selective extraction of hydrocarbon lubricating oils, it should be noted that the apparatus may be used with advantage for other similar operations wherein it is desired to contact a plurality of partially immiscible fluids and separately withdraw from the operation a plurality of fluid products produced by this contact. By partially immiscible fluids, as used herein, I means fluids which are not substantially completely miscible or soluble in one another but which are sufficiently miscible to effect a selective extraction of one of the fluids by contact with one or more other fluids.

The method of refining as carried out by the above described apparatus is claimed in my co-pending application 157,748, filed on the same date as this application.

I claim:

1. Apparatus for contacting partially immiscible fluids of different densities which comprises a rotatable bowl, means for introducing a relatively heavy fluid into the central portion of the bowl, means for introducing a relatively light fluid into the outer portion of the bowl, means for introducing a fluid having a density substantially intermediate that of the heavier fluid and that of the lighter fluid at a point substantially intermediate the central and outer portions of the bowl, means for withdrawing the heavier fluid from the outer portion of the bowl, and means for withdrawing the lighter fluid from the central portion of the bowl.

2. Apparatus for contacting partially immiscible fluids of different densities which comprises a rotatable bowl, a plurality of cylinders substantially coaxially aligned within the bowl, the alternate cylinders being provided with openings disposed adjacent the upper portions thereof, the intervening cylinders being provided with openings disposed adjacent the lower portions thereof, means for introducing a relatively heavy fluid into the central portion of the bowl, means for introducing a relatively light fluid into the outer portion of the bowl, means for introducing a fluid having a density substantially intermediate that of the heavier fluid and that of the lighter fluid at a point substantially intermediate the central and outer portions of the bowl, means for withdrawing the heavier fluid from the outer portion of the bowl, and means for withdrawing the lighter fluid from the central portion of the bowl.

3. Apparatus for contacting partially immiscible fluids of different densities which comprises a rotatable bowl having a false cover and a false bottom, a plurality of cylinders substantially coaxially aligned within the bowl attached to and depending from the false cover, a plurality of cylinders substantially coaxially aligned within the bowl attached to and extending upwardly from the false bottom and adapted to be disposed in spaced relationship intermediate adjacent cylinders of the cylinders depending from the false cover, means for introducing into the bowl a plurality of fluids of different densities, and means for withdrawing said fluids from the bowl.

4. Apparatus for contacting partially immiscible fluids of different densities which comprises a rotatable bowl provided with a cover and having a false cover and a false bottom providing a space at the top and bottom of the bowl with each space communicating with the interior of the bowl adjacent the outer portion thereof, a plurality of cylinders substantially coaxially aligned within the bowl attached to and depending from the false cover, a plurality of cylinders substantially coaxially aligned within the bowl attached to and extending upwardly from the false bottom, means for introducing a relatively heavy fluid into the central portion of the bowl, means for introducing a relatively light fluid into the space provided by the false bottom, means for withdrawing the heavier fluid from the outer portion of the bowl through the space provided by the false cover, and means for withdrawing the lighter fluid from the central portion of the bowl.

5. Apparatus for contacting partially immiscible fluids of different densities which comprises a rotatable bowl provided with a cover and having a false cover and a false bottom providing a space at the top and bottom of the bowl with each space communicating with the interior of the bowl adjacent the outer portion thereof, a plurality of cylinders substantially coaxially aligned within the bowl depending from the false cover, a plurality of cylinders substantially coaxially aligned within the bowl attached to and extending upwardly from the false bottom, means for introducing a relatively heavy fluid into the central portion of the bowl, means for introducing a relatively light fluid into the space provided by the false bottom, means for introducing a fluid having a density substantially intermediate that of the heavy fluid and that of the light fluid at a point substantially intermediate the central and outer portions of the bowl, means for withdrawing the heavier fluid from the outer portion of the bowl through the space provided by the false cover, and means for withdrawing the lighter fluid from the central portion of the bowl.

GEORGE THAYER.